(12) United States Patent
Araya et al.

(10) Patent No.: US 8,395,750 B2
(45) Date of Patent: Mar. 12, 2013

(54) LIQUID CRYSTAL DEVICES

(75) Inventors: Kotaro Araya, Hitachiota (JP); Shintaro Takeda, Hitachi (JP); Yasushi Tomioka, Hitachinaka (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 369 days.

(21) Appl. No.: 12/828,708

(22) Filed: Jul. 1, 2010

(65) Prior Publication Data

US 2011/0001917 A1  Jan. 6, 2011

(30) Foreign Application Priority Data

Jul. 6, 2009  (JP) ................. 2009-160113

(51) Int. Cl.
*C09K 19/02* (2006.01)
(52) U.S. Cl. ........................ 349/183; 349/141
(58) Field of Classification Search .............. None
See application file for complete search history.

(56) References Cited

U.S. PATENT DOCUMENTS

| | | | |
|---|---|---|---|
| 5,812,227 A * | 9/1998 | Toshida et al. .............. | 349/88 |
| 5,959,707 A * | 9/1999 | Murai et al. ................ | 349/129 |
| 2003/0151703 A1 | 8/2003 | Nakanishi et al. | |
| 2005/0140904 A1 | 6/2005 | Choi | |
| 2005/0253988 A1 | 11/2005 | Inoue et al. | |
| 2006/0203169 A1 * | 9/2006 | Ozawa et al. .............. | 349/141 |
| 2007/0269613 A1 | 11/2007 | Chien | |

FOREIGN PATENT DOCUMENTS

| | | |
|---|---|---|
| CN | 1437060 | 8/2003 |
| JP | 6-347795 | 12/1994 |
| JP | 2003-177418 | 6/2003 |
| JP | 2003-279995 | 10/2003 |
| JP | 2009-92815 | 4/2009 |

OTHER PUBLICATIONS

Kim Sang et al; "Short pitch cholesteric electro-optical device stabilized by nonuniform polymer network". Applied Physics letters, AIP, American Institute of Physics, Melville, NY US., vol. 86, No. 16 Apr. 15, 2005.

* cited by examiner

*Primary Examiner* — Lucy Chien
(74) *Attorney, Agent, or Firm* — Antonelli, Terry, Stout & Kraus, LLP.

(57) ABSTRACT

There is provided a liquid crystal device that exhibits excellent response properties over a wide temperature range even when the weight percentage of the polymerizable monomer used for generating polymers is decreased. The liquid crystal device according to the present invention is a liquid crystal device which includes a first substrate and a second substrate, at least one of which has an electrode group formed thereon for driving liquid crystals; and a liquid crystal layer sandwiched between the first substrate and the second substrate, in which the liquid crystal layer contains a polymer which is eccentrically distributed on at least one substrate side among the first substrate and the second substrate.

11 Claims, 5 Drawing Sheets

LIQUID CRYSTAL DEVICES

CROSS-REFERENCE TO RELATED APPLICATION

The present application claims priority from Japanese application JP 2009-160113 filed on Jul. 6, 2009, the content of which is hereby incorporated by reference into this application.

BACKGROUND OF THE INVENTION

1. Field of the Invention

The present invention relates to a liquid crystal device, and more particularly, to a liquid crystal device having a liquid crystal layer that contains a polymer.

2. Description of the Related Art

Liquid crystal devices are devices which include a liquid crystal layer provided between a pair of substrates and which display letters, numbers, figures, pictures, and the like using electro-optical effects. As an example of a driving mode of the liquid crystal devices, a TN (Twisted Nematic) mode, an STN (Super Twisted Nematic) mode, a VA (Vertical Alignment) mode, an OCB (Optically Compensated Birefringence) mode, an IPS (In-Plane Switching) mode, and an FFS (Fringe Field Switching) mode are known.

In recent years, the liquid crystal devices using those driving modes have been manufactured for use not only as a liquid crystal device for a desktop personal computer but also as a large-screen liquid crystal device for a liquid crystal television. Moreover, development on a compact liquid crystal device applied to a cellular phone and the like has also seen progress.

Liquid crystal devices of this kind are classified into two types: one is a type (simple matrix type) in which a voltage is selectively applied to electrodes for pixel formation which are formed on each substrate, thus driving a predetermined pixel, and the other is a type (active matrix type) in which various kinds of electrodes and switching elements (active elements) such as thin-film transistors (TFTs) for pixel switching are formed on one substrate, and a predetermined pixel is driven by selecting the active elements. In particular, the latter, i.e., the active matrix-type liquid crystal devices are the major liquid crystal devices since they have excellent performance, for example, in contrast performance and fast display performance.

From a viewpoint that the liquid crystal device is expected to be used as a display device for the liquid crystal television, there is a demand for fast-switching (reduction in response time) to be used for displaying moving pictures in sports programs and other similar programs. As one strategy to meet this demand, the use of low-viscosity liquid crystal compositions can be considered. As such liquid crystal compositions, nematic liquid crystal having fluorine substituted components has been developed in place of nematic liquid crystal having cyano substituted components which has been used in STN liquid crystals. The nematic liquid crystal having fluorine substituted components has high specific resistance as compared with the nematic liquid crystal having cyano substituted components and is thus considered as liquid crystal having high reliability and causing less unevenness in displayed images.

As a strategy to achieve a faster-switching, other than the use of low-viscosity liquid crystal compositions, JP2003-279995A, for example, proposes the use of polymer-stabilized liquid crystal compositions.

SUMMARY OF THE INVENTION

Although the development of the liquid crystal compositions used in the large-screen liquid crystal device such as the liquid crystal television has seen relatively much progress, the development of the liquid crystal compositions used in the compact liquid crystal device such as the cellular phone has not seen much progress. One reason for this is that the large-screen liquid crystal device and the compact liquid crystal device are used in different environments.

That is, for example, liquid crystal televisions are always used at temperatures near room temperature. Therefore, the liquid crystal compositions used in the liquid crystal televisions only need to have the desired properties in a narrow temperature range near room temperature. Therefore, in the related art, an improvement in the properties of the liquid crystal compositions used in the liquid crystal televisions has been focused on the viscosity and response speed at temperatures near room temperature.

To the contrary, for example, cellular phones and car navigations are used over a wide temperature range from a cold environment in winter and a hot environment in summer. Therefore, the liquid crystal compositions used in the cellular phones and car navigations need to exhibit the desired properties over a wide temperature range from low temperatures to high temperatures.

In this respect, the above-mentioned polymer-stabilized liquid crystal compositions are suitable for achieving fast-switching in an operating environment of a wide temperature range. However, in order to obtain polymer-stabilized liquid crystal compositions, it was necessary to fill liquid crystal compositions, which were prepared by adding a considerable weight percentage of photo-polymerizable monomers and polymeric initiators to liquid crystal compositions, between a pair of substrates and then polymerize the photo-polymerizable monomers by irradiating the liquid crystal compositions with ultraviolet so as to generate polymers.

For this reason, impurities such as the polymeric initiators remain inevitably in the liquid crystal layer formed between the pair of substrates. Thus, there was a concern that the impurities have an influence on the reliability of the liquid crystal device such as reduction of the voltage holding ratio.

On the other hand, when the weight percentage of the photo-polymerizable monomers and polymeric initiators added to the liquid crystal compositions was decreased, it was difficult to obtain the effect of improving the response speed with the polymers generated by polymerizing the photo-polymerizable monomers.

The present invention has been made in view of the problems, and an object of the present invention is to provide a liquid crystal device that exhibits excellent response properties over a wide temperature range even when the weight percentage of the polymerizable monomers used for generating polymers is decreased. The above and other objects, features and advantages of the present invention will be apparent from the description in the specification and the accompanying drawings.

In order to solve the problems, according to an embodiment of the present invention, there is provided a liquid crystal device including: a first substrate and a second substrate, at least one of which has an electrode group formed thereon for driving liquid crystals; and a liquid crystal layer sandwiched between the first substrate and the second substrate, wherein the liquid crystal layer contains a polymer which is eccentrically distributed on at least one substrate side among the first substrate and the second substrate. According to this aspect of the present invention, it is possible to provide a liquid crystal device that exhibits excellent response properties over a wide temperature range even when the weight percentage of the polymerizable monomers used for generating polymers is decreased.

In addition, the content of the polymer in the liquid crystal layer may be set to 2.0 wt % or smaller. Moreover, the electrode group may be formed on the first substrate and the second substrate may be facing the first substrate. In this case, the liquid crystal device may be an IPS-mode liquid crystal device. Moreover, 70 wt % or more of the polymer may be contained in a part of the liquid crystal layer close to one of the substrates.

In addition, the polymer may be generated by irradiating ultraviolet to a liquid crystal composition that contains a photo-polymerizable monomer and an ultraviolet absorbing agent between the first substrate and the second substrate so as to polymerize the photo-polymerizable monomer. In this case, the ultraviolet absorbing agent may be an ultraviolet absorbing agent having liquid crystallinity. Furthermore, in this case, the ultraviolet absorbing agent may contain a terphenyl group or a quaterphenyl group in its molecules.

In addition, the polymer may be generated by irradiating light to a liquid crystal composition that contains a photo-polymerizable monomer and a polymeric initiator having a solubility parameter of 12.0 $(cal/cm^3)^{0.5}$ or more between the first substrate and the second substrate so as to polymerize the photo-polymerizable monomer. In this case, the polymeric initiator may be a polymeric initiator having liquid crystallinity.

In addition, a solubility parameter of at least one of alignment layers formed on the first substrate and the second substrate may be 12.0 $(cal/cm^3)^{0.5}$ or more. Moreover, a solubility parameter of an alignment layer formed on one of the first substrate and the second substrate may be larger than a solubility parameter of an alignment layer formed on the other substrate.

The embodiments of the present invention provides the liquid crystal device that exhibits excellent response properties over a wide temperature range even when the weight percentage of the polymerizable monomers used for generating polymers is decreased.

DETAILED DESCRIPTION OF THE INVENTION

Hereinafter, a liquid crystal device according to an embodiment of the present invention will be described. However, the present invention is not limited to the present embodiment.

Figure 1:
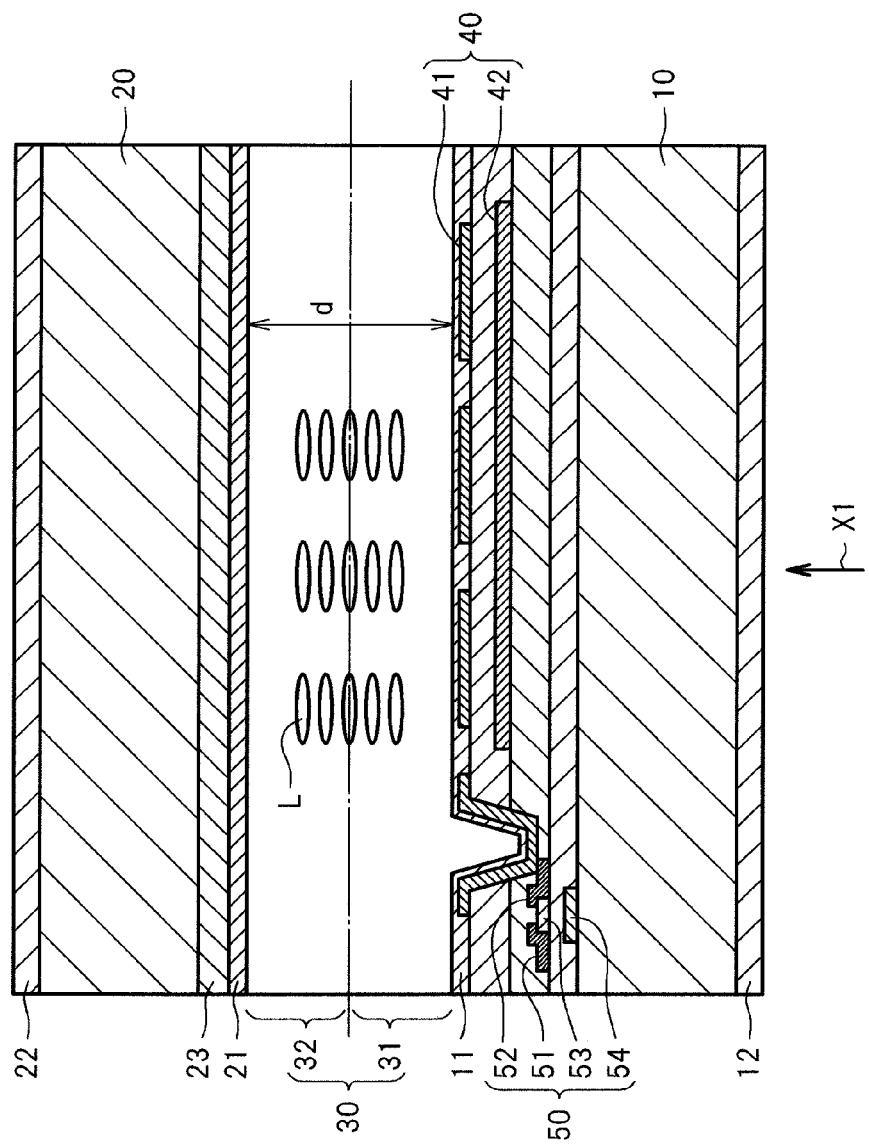
FIG. 1 is a diagram schematically illustrating a cross section of one pixel of a liquid crystal panel of an example of a liquid crystal device according to an embodiment of the present invention.
Figure 2:
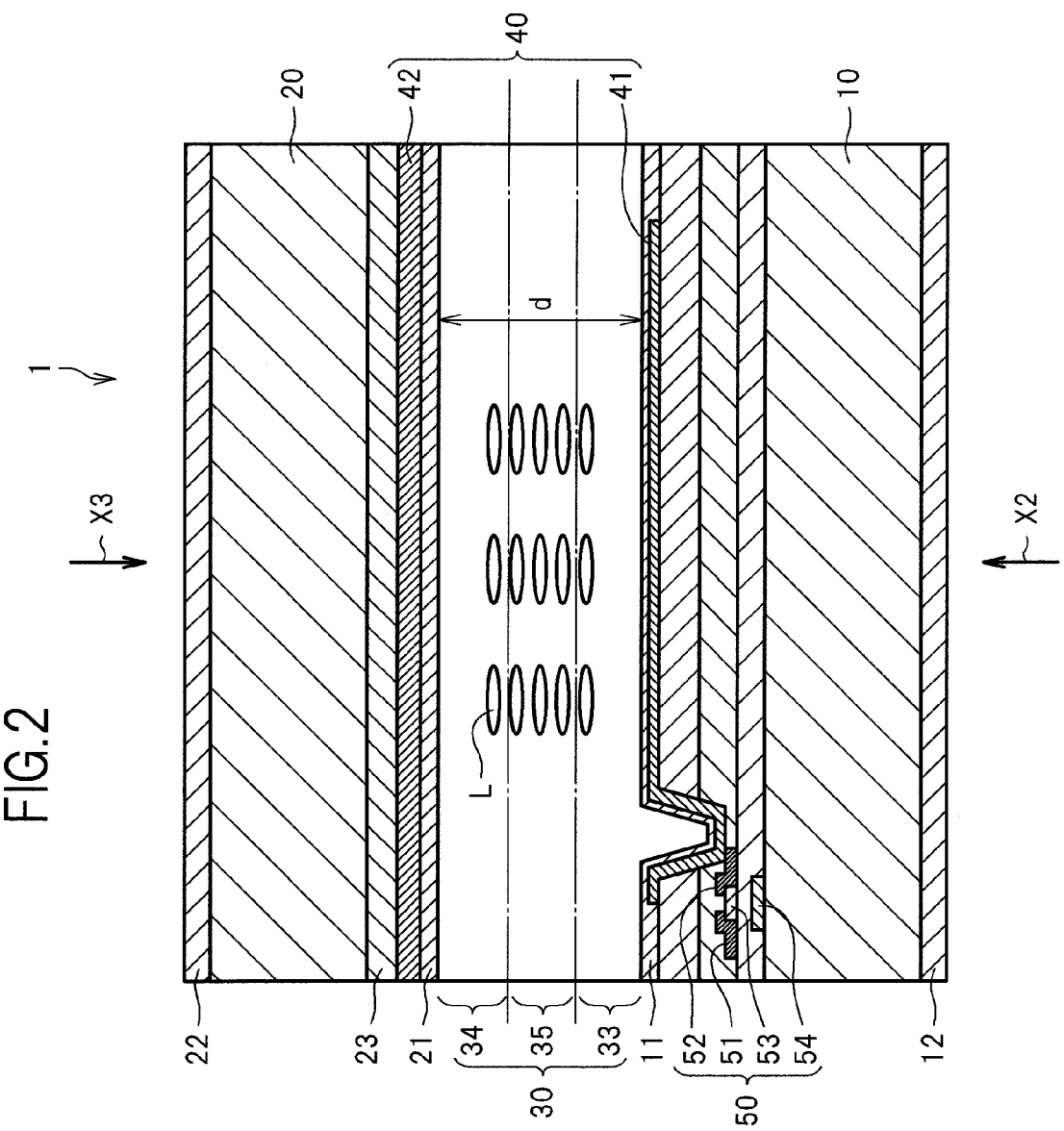
FIG. 2 is a diagram schematically illustrating a cross section of one pixel of a liquid crystal panel of another example of a liquid crystal device according to an embodiment of the present invention.

FIG. 1 is a diagram schematically illustrating a cross section of one pixel of a liquid crystal panel of an example of a liquid crystal device (hereinafter referred to as "present device 1") according to an embodiment of the present invention. FIG. 2 is a diagram schematically illustrating a cross section of one pixel of a liquid crystal panel of another example of the present device 1.

As shown in FIGS. 1 and 2, the present device 1 is a liquid crystal device that includes a pair of substrates 10 and 20, at least one of which has an electrode group 40 formed thereon for driving a liquid crystal L, and a liquid crystal layer 30 sandwiched between the pair of substrates 10 and 20.

The pair of substrates 10 and 20 according to the example shown in FIG. 1 is made up of a first substrate 10 having the electrode group 40 formed thereon and a second substrate 20 facing the first substrate 10. That is, the present device 1 according to the example shown in FIG. 1 includes the first substrate 10 having the electrode group 40 that includes a pixel electrode 41 and a common electrode 42, the second substrate 20 facing the first substrate 10, and the liquid crystal layer 30 made up of a liquid crystal composition which is filled between the first substrate 10 and the second substrate 20.

In this manner, when the electrode group 40 is formed on one of the substrates, the present device 1 can be used as a liquid crystal device of the IPS or FFS mode, for example. In the example shown in FIG. 1, the pixel electrode 41 has an interdigitated shape (a comb-teeth shape).

On the other hand, the present device 1 according to the example shown in FIG. 2 includes the first substrate 10 having the pixel electrode 41 formed thereon, the second substrate 20 having the common electrode 42 formed thereon and facing the first substrate 10, and the liquid crystal layer 30 made up of a liquid crystal composition which is filled between the first substrate 10 and the second substrate 20.

In this manner, when a portion of the electrode group 40 is formed on one of the substrates, and the other portion of the electrode group 40 is formed on the other substrate, the present device 1 can be used as a liquid crystal device of the TN, STN, VA, or OCB mode, for example.

Moreover, a TFT 50 is formed on the first substrate 10. The TFT 50 includes a source electrode 51, a drain electrode 52, an amorphous silicon layer 53, and a gate electrode 54. The TFT 50 is provided at each intersection of signal lines and scanning lines (not shown) so as to correspond to each of a plurality of pixel portions provided on the liquid crystal panel. The TFT 50 drives the liquid crystal L by forming an electric field between a specific pixel electrode 41 connected to the TFT 50 and the common electrode 42 in accordance with a voltage selectively applied to the gate electrode 54.

In the present device 1, an alignment layer 11 is formed on the first substrate 10 to be in contact with the liquid crystal layer 30 so as to achieve alignment of the liquid crystal L contained in the liquid crystal layer 30. On the other hand, an alignment layer 21 is formed on the second substrate 20 to be in contact with the liquid crystal layer 30 so as to achieve alignment of the liquid crystal L contained in the liquid crystal layer 30. The surfaces in contact with the alignment layers 11 and 21 of the liquid crystal layer 30 are subjected to an alignment treatment for causing the liquid crystal L to be aligned along the surfaces.

A color filter 23 is formed on the second substrate 20. A polarization plate 12 is formed on a surface of the first substrate 10 on the opposite side of the liquid crystal layer 30. A polarization plate 22 is formed on a surface of the second substrate 20 on the opposite side of the liquid crystal layer 30. Moreover, the present device 1 includes a backlight (not shown) on the first substrate 10 side of the liquid crystal panel.

In the present device 1, the liquid crystal layer 30 contains a polymer which is eccentrically distributed on at least one of the pair of substrates 10 and 20. That is, liquid crystal composition that constitutes the liquid crystal layer 30 contains the polymer for improving response properties in addition to the liquid crystal L. The liquid crystal composition to which the polymer has been added in this manner is sometimes referred to as a polymer stabilized-liquid crystal (PS-LC). In the liquid crystal layer 30 of the present device 1, the polymer that stabilizes the liquid crystal L is eccentrically distributed on one or both of the first substrate 10 and the second substrate 20.

In the present device 1 according to the example shown in FIG. 1, the liquid crystal layer 30 contains the polymer which is eccentrically distributed on the first substrate 10 side where the electrode group 40 is formed. More specifically, when the liquid crystal layer 30 is divided into two equal parts, i.e., a first part 31 close to the first substrate 10 and a second part 32 close to the second substrate 20 as indicated by a one-dot chain line in FIG. 1, the polymer contained in the liquid crystal layer 30 is eccentrically distributed in the first part 31.

That is, the content of the polymer in the first part 31 is larger than the content of the polymer in the second part 32. For example, in the present device 1 according to this example, 70 wt % or more of the polymer is contained in the first part 31 which is the one substrate-side part of the liquid crystal layer 30.

On the other hand, in the present device 1 according to the example shown in FIG. 2, the liquid crystal layer 30 contains polymer which is eccentrically distributed on each of the first substrate 10 side where the pixel electrode 41 is formed and the second substrate 20 side where the common electrode 42 is formed. More specifically, when the liquid crystal layer 30 is divided into three equal parts, i.e., a first part 33 close to the first substrate 10, a second part 34 close to the second substrate 20, and the remaining third part 35 as indicated by two one dot-chain lines in FIG. 2, the polymer contained in the liquid crystal layer 30 is eccentrically distributed in the first and second parts 33 and 34.

That is, the content of the polymer in the first part 33 and the content of the polymer in the second part 34 are larger than the content of the polymer in the third part 35, respectively. For example, in the present device 1 according to this example, 70 wt % or more of the polymer is contained in the first part 33 which is the first substrate-side part of the liquid crystal layer 30 and the second part 34 which is the other substrate-side part of the liquid crystal layer 30.

Figure 3:
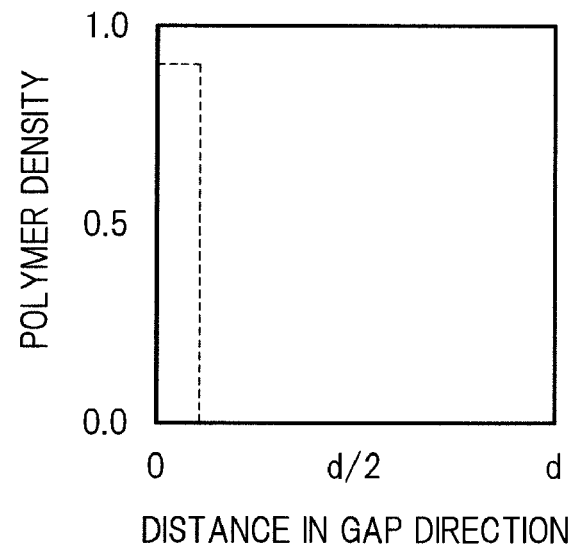
FIG. 3 is a diagram schematically illustrating an example of a distribution of a polymer in a liquid crystal layer of the liquid crystal device shown in FIG. 1.
Figure 4:
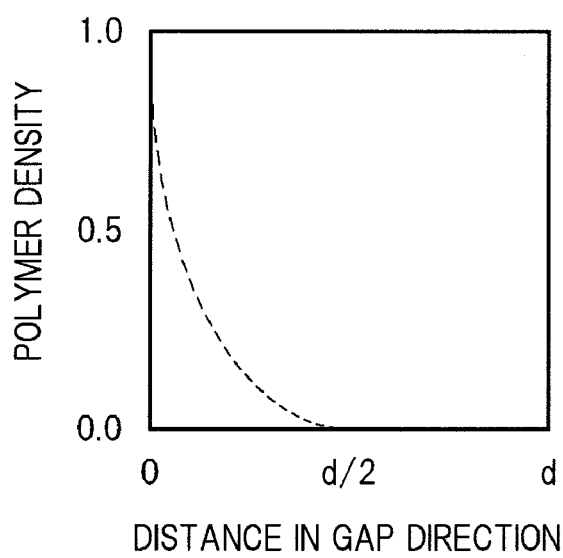
FIG. 4 is a diagram schematically illustrating another example of a distribution of a polymer in a liquid crystal layer of the liquid crystal device shown in FIG. 1.
Figure 5:
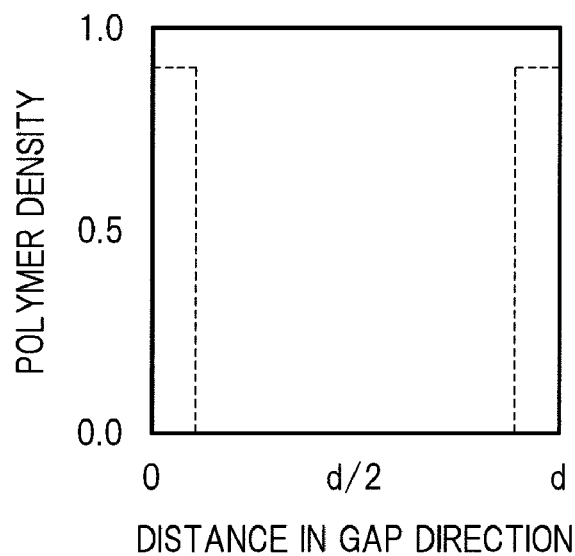
FIG. 5 is a diagram schematically illustrating an example of a distribution of a polymer in a liquid crystal layer of the liquid crystal device shown in FIG. 2.
Figure 6:
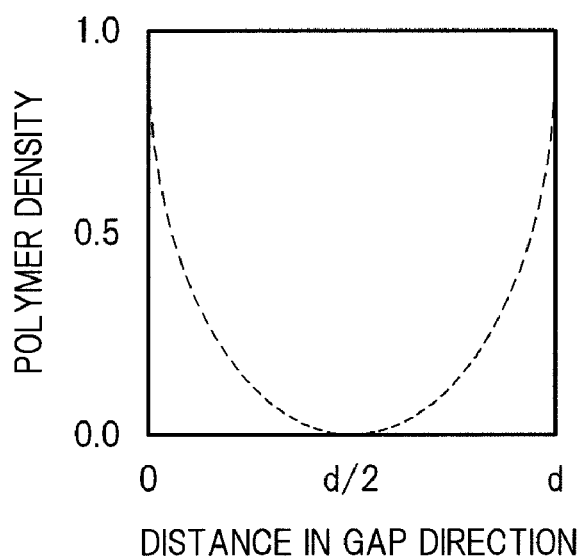
FIG. 6 is a diagram schematically illustrating another example of a distribution of a polymer in a liquid crystal layer of the liquid crystal device shown in FIG. 2.

FIGS. 3 and 4 are diagrams schematically illustrating a distribution of the polymer in the liquid crystal layer 30 according to the example shown in FIG. 1. FIGS. 5 and 6 are diagrams schematically illustrating a distribution of the polymer in the liquid crystal layer 30 according to the example shown in FIG. 2. In FIGS. 3 to 6, when a direction from the first substrate 10 toward the second substrate 20 is referred to as a gap direction, and the thickness of the liquid crystal layer 30 is indicated as "d" (see FIGS. 1 and 2), the horizontal axis represents a distance in the gap direction from the first substrate 10, and the vertical axis represents a density of the polymer at a corresponding distance in the gap direction.

In the present device 1 in which the electrode group 40 is formed on only the first substrate 10 as shown in FIG. 1, for example, the polymer can be eccentrically distributed to only the vicinity of the first substrate 10 side of the liquid crystal layer 30 as shown in FIG. 3. Moreover, in this case, the density of the polymer may gradually decrease from the vicinity of the first substrate 10 toward the second substrate 20 side as shown in FIG. 4.

On the other hand, in the present device 1 in which the pixel electrode 41 is formed on the first substrate 10, and the common electrode 42 is formed on the second substrate 20 as shown in FIG. 2, for example, the polymer can be eccentrically distributed to the vicinity of the first substrate 10 and the vicinity of the second substrate 20 of the liquid crystal layer 30 as shown in FIG. 5. Moreover, in this case, as shown in FIG. 6, the density of the polymer may gradually decrease from the vicinity of the first substrate 10 toward the second substrate 20 side and may gradually decrease from the vicinity of the second substrate 20 toward the first substrate 10 side.

In this manner, by causing the polymer of the liquid crystal layer 30 to be eccentrically distributed to the vicinity of one or both of the first substrate 10 and the second substrate 20, it is possible to obtain a sufficient effect of the polymer of improvement in the response properties while an amount of a polymerizable monomer used for generating the polymer is minimized. In this respect, although the content of the polymer in the liquid crystal layer 30 is not particularly limited as long as it is within a range where the present device 1 exhibits excellent response properties over a wide temperature range, the content is preferably reduced as much as possible.

That is, the content of the polymer in the liquid crystal layer 30 (the proportion of the polymer relative to the total weight of the liquid crystal composition constituting the liquid crystal layer 30) can be set to 2.0 wt % or smaller, for example, and preferably, to 1.5 wt % or smaller, and more preferably, to 1.0 wt % or smaller.

In addition, the content of the polymerizable monomer used for generating the polymer when forming the liquid crystal layer 30 (the proportion of the polymerizable monomer relative to the total weight of the liquid crystal composition constituting the liquid crystal layer 30) can be set to 2.0 wt % or smaller, for example, and preferably, to 1.5 wt % or smaller, and more preferably, to 1.0 wt % or smaller.

In these cases, the content of the liquid crystal L in the liquid crystal layer 30 (the proportion of the liquid crystal L relative to the total weight of the liquid crystal composition constituting the liquid crystal layer 30) can be set to 98.0 to 99.0 wt %, for example. As the liquid crystal L contained in the liquid crystal composition, a nematic liquid crystal can be preferably used.

The polymer contained in the liquid crystal layer 30 is generated by filling liquid crystal composition containing polymerizable monomer between the pair of substrates 10 and 20 and then polymerizing the polymerizable monomer in the liquid crystal composition between the pair of substrates 10 and 20. The polymerizable monomer can be polymerized without applying an electric field to the liquid crystal layer 30.

As the polymerizable monomer, for example, photo-polymerizable monomer which is polymerized with light irradiation can be preferably used. That is, a photo-polymerizable monomer having an acrylic group can be preferably used. Specifically, for example, an acrylic acid having one or both of a long-chain alkyl group and an aromatic ring, an acrylate ester, a methacrylate ester, and derivatives thereof can be preferably used.

Moreover, a polymerizable monomer having liquid crystallinity may be used. By using the polymerizable monomer having liquid crystallinity, the effect of stabilizing the liquid crystal L with the polymer can be increased effectively. As the polymerizable monomer, one kind of the materials mentioned above can be used solely, and two or more kinds thereof can be used in combination.

When the photo-polymerizable monomer is used, the polymer contained in the liquid crystal layer 30 can be generated by polymerizing the photo-polymerizable monomer by irradiating light to the liquid crystal composition containing the photo-polymerizable monomer between the pair of substrates 10 and 20.

That is, first, the pair of substrates 10 and 20 on which the electrode group 40 and the alignment layers 11 and 21 are formed, and the liquid crystal composition containing the liquid crystal L and the photo-polymerizable monomer are prepared. Subsequently, the first substrate 10 and the second substrate 20 are bonded together, and the liquid crystal composition are filled between the first substrate 10 and the second substrate 20.

Thereafter, the liquid crystal composition is irradiated with light under a condition suitable for polymerization of the photo-polymerizable monomer through one or both of the first substrate 10 and the second substrate 20. By this light irradiation, polymerization of the photo-polymerizable monomer in the liquid crystal composition progresses and the polymer is generated. Although the irradiation light is not particularly limited as long as it can polymerize the photo-polymerizable monomer, ultraviolet can be preferably used, for example. In the manufacturing process of the present device 1, it is possible to form the liquid crystal layer 30 in which the polymer is eccentrically distributed by appropriately setting the polymerization condition of the photo-polymerizable monomer.

That is, for example, the polymer is generated by polymerizing the photo-polymerizable monomer by irradiating ultraviolet to the liquid crystal composition containing the photo-polymerizable monomer and an ultraviolet absorbing agent between the pair of substrates 10 and 20.

In the present device 1 according to the example shown in FIG. 1, ultraviolet is irradiated in the direction indicated by an arrow X1 shown in FIG. 1 through the first substrate 10 on which the electrode group 40 is formed. On the other hand, in the present device 1 according to the example shown in FIG. 2, ultraviolet is irradiated in the direction indicated by arrows X2 and X3 shown in FIG. 2 through each of the first substrate 10 on which the pixel electrode 41 is formed and the second substrate 20 on which the common electrode 42 is formed.

Here, since the liquid crystal composition contain the ultraviolet absorbing agent, a part of the ultraviolet irradiated to the liquid crystal composition will be absorbed by the ultraviolet absorbing agent. Therefore, in the present device 1 according to the example shown in FIG. 1, polymerization of the photo-polymerizable monomer in the second part 32 of the liquid crystal layer 30 close to the second substrate 20 is suppressed.

On the other hand, in the first part 31 of the liquid crystal layer 30 close to the first substrate 10, particularly in the vicinity of the alignment layer 11 formed on the first substrate 10, the photo-polymerizable monomer is polymerized quickly, and the polymer is generated with high efficiency. As a result, the liquid crystal layer 30 contains the polymer which is eccentrically distributed on the first substrate 10 side.

In the present device 1 according to the example shown in FIG. 2, polymerization of the photo-polymerizable monomer in the third part 35 in the liquid crystal layer 30, which is a deep part distant from the first substrate 10 and the second substrate 20, is suppressed.

On the other hand, in the first part 33 in the liquid crystal layer 30 close to the first substrate 10 (particularly, in the vicinity of the alignment layer 11 formed on the first substrate 10) and the second part 34 close to the second substrate 20 (particularly, in the vicinity of the alignment layer 21 formed on the second substrate 20), the photo-polymerizable monomer is quickly polymerized, and the polymer is generated with high efficiency. As a result, the liquid crystal layer 30 contains the polymer which is eccentrically distributed on each of the first substrate 10 side and the second substrate side.

The ultraviolet absorbing agent is not particularly limited as long as it effectively absorbs ultraviolet irradiated to the liquid crystal composition, and arbitrary kind of an ultraviolet absorbing agent can be appropriately selected and used. The ultraviolet absorbing agent may be an ultraviolet absorbing agent having liquid crystallinity, for example. That is, an ultraviolet absorbing agent which contains a terphenyl group or a quaterphenyl group in its molecule can be used, for example. The use of the ultraviolet absorbing agent having liquid crystallinity effectively suppresses a decrease in the nematic-isotropic phase transition temperature caused by adding the ultraviolet absorbing agent to the liquid crystal composition.

When polymerization is performed under the presence of the ultraviolet absorbing agent, the liquid crystal layer 30 after the polymerization contains the ultraviolet absorbing agent. That is, the ultraviolet absorbing agent remains in the liquid crystal layer 30 which contains the polymer, and in which polymerization of the photo-polymerizable monomer is finished.

Moreover, for example, the polymer is generated by polymerizing the photo-polymerizable monomer by irradiating light to the liquid crystal composition that contains the photo-polymerizable monomer and a polymeric initiator having a solubility parameter of 12.0 $(cal/cm^3)^{0.5}$ or more between the pair of substrates 10 and 20.

The solubility parameter is defined in accordance with the Fedors method (R. F. Fedors, "Method for estimating both the solubility parameters and molar volumes of liquids," Polym. Eng. Sci., vol. 14, no. 2, pp. 147-154, 1974).

As the polymeric initiator having a solubility parameter of 12.0 $(cal/cm^3)^{0.5}$ or more, 9-fluorenone, 1-hydroxycyclohexylphenylketone, dibenzosuberone, 2-hydroxy-2-methyl-propiophenone, benzoin, 2-benzyl benzoate, and 4-benzyl benzoate can be used, for example.

As the polymeric initiator whose solubility parameter is smaller than 12.0 $(cal/cm^3)^{0.5}$, 2,2-diethoxyacetophenone, benzoin isobutyl ether, benzoin isopropyl ether, acetophenone, 2,2-diethoxy-phenyl-acetophenone, benzoin ethyl ether, benzoin methyl ether, camphorquinone, 2,2-dimethoxy-2-phenylacetophenone, 2-chlorobenzophenone, 2-ethylanthraquinone, 4-4'-dichlorobenzophenone, 4-chlorobenzophenone, benzyl, benzophenone, methyl-2-benzyl benzoate ether, and p-anisyl can be used, for example.

When the solubility parameter of the polymeric initiator contained in the liquid crystal composition is 12.0 $(cal/cm^3)^{0.5}$ or more, in the liquid crystal composition before the polymerization, filled between the pair of substrates 10 and 20, the polymeric initiator is eccentrically distributed to the vicinities of the alignment layers 11 and 21 of the pair of substrates 10 and 20.

That is, for example, when the solubility parameter of the liquid crystal L contained in the liquid crystal composition is 9.0 to 10.0 $(cal/cm^3)^{0.5}$, since the polymeric initiator has a low solubility to the liquid crystal L, the polymeric initiator is eccentrically distributed to the vicinity of each of the alignment layer 11 of the first substrate 10 and the alignment layer 21 of the second substrate 20.

Therefore, in a state where the polymeric initiator is eccentrically distributed to the vicinities of the alignment layers 11 and 21 of the pair of substrates 10 and 20, by irradiating light through the pair of substrates 10 and 20, the photo-polymerizable monomer is polymerized preferentially in the vicinities of the alignment layers 11 and 21.

That is, in the present device 1 according to the example shown in FIG. 1, the photo-polymerizable monomer is quickly polymerized in the first part 31 of the liquid crystal layer 30 close to the first substrate 10, particularly in the vicinity of the alignment layer 11 formed on the first substrate 10, whereby the polymer is generated with high efficiency. As a result, the liquid crystal layer 30 contains the polymer which is eccentrically distributed on the first substrate 10 side.

In addition, in the present device 1 according to the example shown in FIG. 2, the photo-polymerizable monomer is quickly polymerized in the first part 33 of the liquid crystal layer 30 close to the first substrate 10 (particularly, in the vicinity of the alignment layer 11 formed on the first substrate 10) and the second part 34 close to the second substrate 20 (particularly, in the vicinity of the alignment layer 21 formed on the second substrate 20), whereby the polymer is generated with high efficiency. As a result, the liquid crystal layer 30 contains the polymer which is eccentrically distributed on each of the first substrate 10 side and the second substrate 20 side.

The polymeric initiator is not particularly limited as long as it effectively initiates the polymerization of the photo-polymerizable monomer in response to the light irradiation to the liquid crystal composition, and arbitrary kind of polymeric initiator can be appropriately selected and used. That is, for example, polymeric initiator which generates free radicals upon irradiation of ultraviolet to accelerate effectively radical polymerization of photo-polymerizable monomer can be preferably used.

The polymeric initiator may be a polymeric initiator having liquid crystallinity. The use of the polymeric initiator having liquid crystallinity effectively suppresses nonuniform adsorption of the polymeric initiator on the alignment layers 11 and 21 without decreasing the solubility of the polymeric initiator in the liquid crystal composition.

The liquid crystal layer 30 after the polymerization may contain the polymeric initiator. That is, the liquid crystal layer 30 which contains the polymer and in which the polymerization of the photo-polymerizable monomer is finished may contain the polymeric initiator that did not participate in the polymerization or the polymeric initiator after the polymerization.

In addition, in the present device 1, for example, the solubility parameter of at least one of the alignment layers 11 and 21 formed on the pair of substrates 10 and 20 may be set to 12.0 $(cal/cm^3)^{0.5}$ or more.

That is, the solubility parameter of only one of the alignment layer 11 formed on the first substrate 10 and the alignment layer 21 formed on the second substrate 20 may be set to 12.0 $(cal/cm^3)^{0.5}$ or more, and the solubility parameters of both alignment layers 11 and 21 may be set to 12.0 $(cal/cm^3)^{0.5}$ or more.

In this case, in the liquid crystal composition before the polymerization, filled between the pair of substrates 10 and 20, the polymeric initiator is eccentrically distributed to the vicinity of an alignment layer whose solubility parameter is 12.0 $(cal/cm^3)^{0.5}$ or more, among the alignment layers 11 and 21 of the pair of substrates 10 and 20.

That is, for example, when the solubility parameter of the alignment layer 11 of the first substrate 10 is 12.0 $(cal/cm^3)^{0.5}$ or more, and the solubility parameter of the polymeric initiator is larger than the solubility parameter of the liquid crystal L (for example, when the solubility parameter of the liquid crystal L is 9.0 to 10.0 $(cal/cm^3)^{0.5}$, and the solubility parameter of the polymeric initiator is 12.0 $(cal/cm^3)^{0.5}$ or more,) the polymeric initiator is eccentrically distributed to the vicinity of the alignment layer 11.

Therefore, in a state where the polymeric initiator is eccentrically distributed to the vicinity of the alignment layer 11 of the first substrate 10, whose solubility parameter is 12.0 $(cal/cm^3)^{0.5}$ or more, among the alignment layers 11 and 21 of the pair of substrates 10 and 20, by irradiating light through the first substrate 10, the photo-polymerizable monomer is polymerized preferentially in the vicinity of the alignment layer 11 of the first substrate 10. As a result, the liquid crystal layer 30 contains the polymer which is eccentrically distributed on the first substrate 10 side where the alignment layer 11 whose solubility parameter is 12.0 $(cal/cm^3)^{0.5}$ or more is formed.

The alignment layers 11 and 21 are not particularly limited as long as they can effectively achieve alignment of the liquid crystal L contained in the liquid crystal layer 30, and for example, the alignment layers 11 and 21 which are made from polyimide and subjected to an appropriate alignment treatment can be preferably used.

In addition, although the solubility parameters of the alignment layers 11 and 21 can be set to be smaller than 12.0 $(cal/cm^3)^{0.5}$, for example, the solubility parameters are preferably set to 10.0 $(cal/cm^3)^{0.5}$ or more. By setting the solubility parameters of the alignment layers 11 and 21 to 10.0 $(cal/cm^3)^{0.5}$ or more, the polymeric initiator is eccentrically distributed to the vicinities of the alignment layers 11 and 21.

In addition, in the present device 1, the solubility parameter of an alignment layer formed on one of the pair of substrates 10 and 20 may be larger than the solubility parameter of an alignment layer formed on the other substrate.

That is, for example, the solubility parameter of the alignment layer 11 formed on the first substrate 10 may be larger than the solubility parameter of the alignment layer 21 formed on the second substrate 20. In this case, in the liquid crystal composition before the polymerization, filled between the pair of substrates 10 and 20, the polymeric initiator is eccentrically distributed in the vicinity of the alignment layer 11 of the first substrate 10, whose solubility parameter is the larger among the alignment layers 11 and 21 of the pair of substrates 10 and 20.

Therefore, in a state where the polymeric initiator is eccentrically distributed to the vicinity of the alignment layer 11 of the first substrate 10, having the larger solubility parameter, by irradiating light through the first substrate 10, the photo-polymerizable monomer is polymerized preferentially in the vicinity of the alignment layer 11 of the first substrate 10. As a result, the liquid crystal layer 30 contains the polymer which is eccentrically distributed to the first substrate 10 side where the alignment layer 11 whose solubility parameter is the larger is formed.

In particular, as in the case of the present device 1 according to the example shown in FIG. 1, when the electrode group 40 is formed on the first substrate 10 which is one of the substrates, it is preferable that the polymer is eccentrically distributed on the first substrate 10 side of the liquid crystal layer 30.

In this respect, in a state where the solubility parameter of the alignment layer 11 of the first substrate 10 is set to be larger than the solubility parameter of the alignment layer 21 of the second substrate 20 so that the polymeric initiator is eccentrically distributed to the vicinity of the alignment layer 11 of the first substrate 10, by performing polymerization of the photo-polymerizable monomer by irradiating light through the first substrate 10, it is possible to effectively cause the polymer to be eccentrically distributed on the first substrate 10 side.

In addition, for example, the solubility parameter of an alignment layer formed on one of the pair of substrates 10 and 20 may be larger than the solubility parameter of an alignment layer formed on the other substrate and may be set to 12.0 $(cal/cm^3)^{0.5}$ or more.

That is, for example, the solubility parameter of the alignment layer 11 formed on the first substrate 10 may be larger than the solubility parameter of the alignment layer 21 formed on the second substrate 20 and may be set to 12.0 $(cal/cm^3)^{0.5}$ or more.

In this case, in the liquid crystal composition before the polymerization, filled between the pair of substrates 10 and 20, the polymeric initiator is eccentrically distributed to the vicinity of the alignment layer 11 of the first substrate 10, whose solubility parameter is the larger among the alignment layers 11 and 21 of the pair of substrates 10 and 20 and is 12.0 $(cal/cm^3)^{0.5}$ or more.

Therefore, the liquid crystal layer 30 contains the polymer which is eccentrically distributed on the first substrate 10 side where the alignment layer 11 whose solubility parameter is the larger and is 12.0 $(cal/cm^3)^{0.5}$ or more is formed.

Next, specific examples of the present embodiment will be described.

EXAMPLE 1

An IPS-mode liquid crystal device having the liquid crystal panel shown in FIG. 1 was manufactured. The liquid crystal device had a size of 100 mm (longer side) by 100 mm (shorter side). Moreover, the liquid crystal panel had a diagonal size of about 6 inches and a thickness of 1.1 mm.

The liquid crystal panel had a pair of substrates 10 and 20 facing each other and a liquid crystal layer 30 sandwiched between the pair of substrates 10 and 20 as shown in FIG. 1. As the first substrate 10 and the second substrate 20, a transparent glass substrate whose surfaces are polished was used.

On the first substrate 10 which is one of the glass substrates, as shown in FIG. 1, an electrode group 40 including a pixel electrode 41 made from ITO and a common electrode 42 made from ITO, a TFT 50, an insulating film, an alignment layer 11, and a polarization plate 12 were formed. The first substrate 10 was used as a TFT substrate. Moreover, on the second substrate 20 which is the other glass substrate, a color filter 23, an alignment layer 21, and a polarization plate 22 were formed. The second substrate 20 was used as a color filter substrate.

Polyimide was used as the material that constitutes the alignment layers 11 and 21. That is, first, polyimide was deposited using a printing machine and baked, whereby the alignment layers 11 and 21 having a thickness of 0.07 to 0.1 μm were formed. Thereafter, the surfaces of the alignment layers 11 and 21 were subjected to an alignment treatment for achieving alignment of liquid crystal molecule L contained in the liquid crystal layer 30. The alignment treatment was performed using a rubbing machine having buffing cloth made from rayon as a rubbing roll. A rubbing angle was 45° with respect to the shorter side, and the rubbing was performed in parallel between the pair of substrates 10 and 20.

The solubility parameters of the alignment layers 11 and 21 were 10.9 $(cal/cm^3)^{0.5}$. The polyimide that constitutes the alignment layers 11 and 21 was polyimide that had a main skeleton which was generated by polymerizing n-hexane tetra carbonate dianhydrides used as tetra carbonate dianhydrides and 1,6-diaminohexane used as diamine derivatives.

Figure 7:
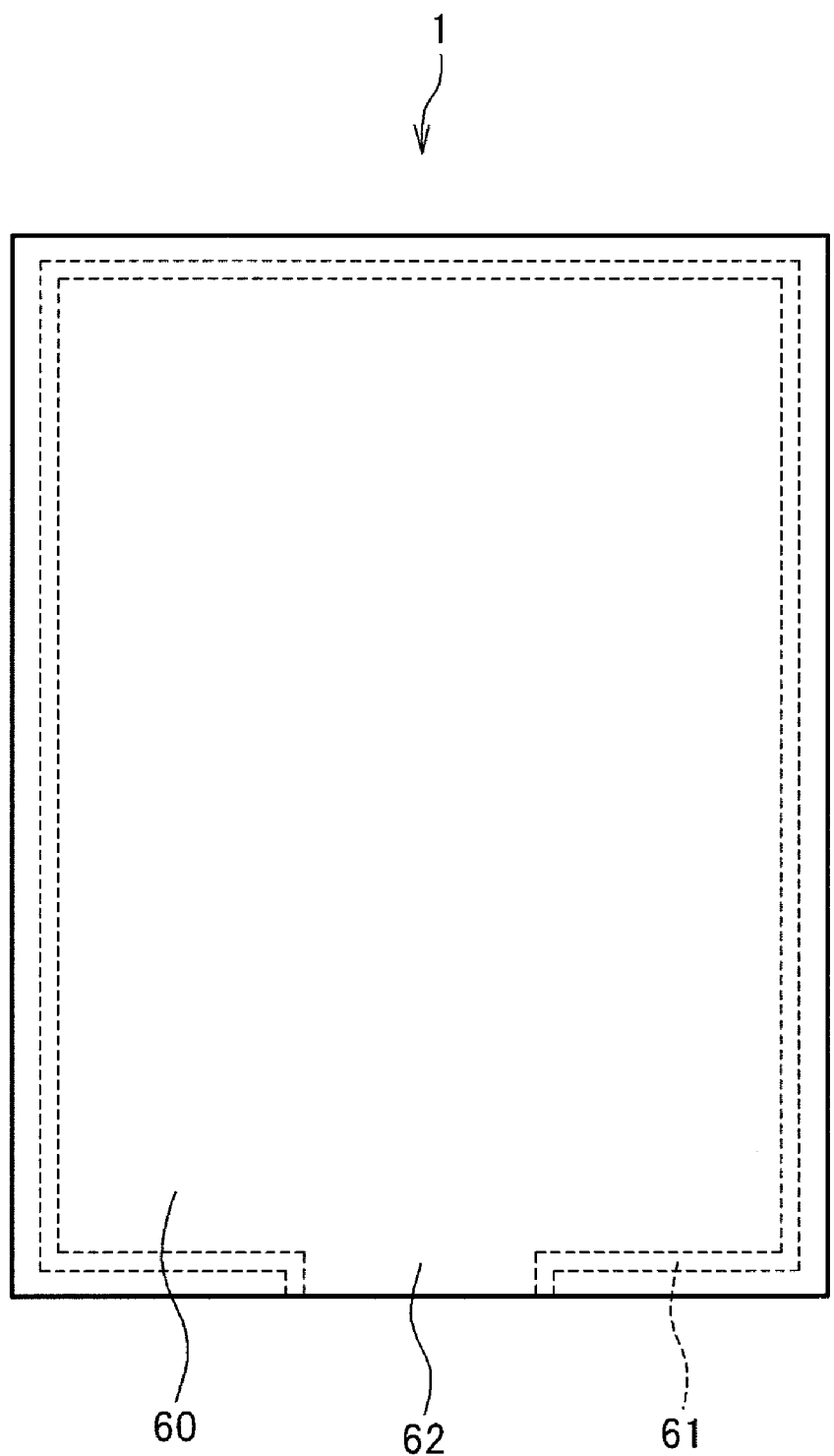
FIG. 7 is a diagram illustrating a process of filling a liquid crystal composition in a liquid crystal device according to an embodiment of the present invention.

The first substrate 10 and the second substrate 20 were bonded together by a frame-shaped sealing portion 61 shown in FIG. 7. That is, an appropriate amount of polymer beads were mixed into a sealing agent made from epoxy resin to prepare a composite sealing agent, and the composite sealing agent was printed on one of the substrates using a seal mask, whereby the sealing portion 61 was formed. Thereafter, the composite sealing agent constituting the sealing portion 61 was precured so that the pair of substrates 10 and 20 was combined together. After that, the composite sealing agent was cured while pressing the pair of substrates 10 and 20 using a press.

Inside a panel portion 60 surrounded by the pair of substrates 10 and 20 and the sealing portion 61, a gap in which the spherical polymer beads were interposed and liquid crystal composition was filled was adjusted to be 8.0 μm. A width of a liquid crystal filling opening 62 for filling the liquid crystal composition into the panel portion 60 was 10 mm.

On the other hand, liquid crystal composition (hereinafter referred to as "liquid crystal composition No. 1") including polymerizable monomer, polymeric initiator, and liquid crystal L were produced. As the polymerizable monomer, bifunctional acrylic monomer was used. As the polymeric initiator, 2,2-diethoxy-phenyl-acetophenone (IRGACURE 651: NAGASE & CO., LTD) was used. As the liquid crystal L, fluorine nematic liquid crystal composition was used.

The solubility parameter of the polymeric initiator was 10.7 $(cal/cm^3)^{0.5}$. That is, since the 2,2-diethoxy-phenyl-acetophenone includes two phenyl rings ($C_6H_5$—), methyl groups ($CH_3$—), and ether groups (—O—), and one ketone (>C=O) and carbon (>C<), by the Fedors method mentioned above, its evaporation energy was calculated as 23610 cal/mol and its molecular volume was calculated as 209 $cm^3$/mol. Thus, the solubility parameter was calculated as 10.7 $(cal/cm^3)^{0.5}$ from these values.

The weight percentages of the polymerizable monomer, polymeric initiator, and liquid crystal L in the liquid crystal composition No. 1 were 1.0 wt %, 0.05 wt %, and 98.95 wt %, respectively.

Subsequently, the liquid crystal composition No. 1 was filled into the panel portion 60. That is, the liquid crystal device was placed in a sealable container (not shown) with the liquid crystal filling opening 62 facing downward. Moreover, the liquid crystal composition No. 1 was poured in a liquid crystal dish which is connected to a lifting device provided outside the container. The liquid crystal composition No. 1 was held in a slightly raised state within the liquid crystal dish. Outside the container, a pipe connected to a vacuum pump and a Pirani vacuum gauge was laid out. The vacuum pump was driven, and an exhaust gas volume was adjusted using an adjustment valve while monitoring the Pirani vacuum gauge. The exhausting was performed for 120 minutes until the degree of vacuum reached 5 Pa so that the container was put into a low-pressure state.

Subsequently, the lifting device was operated so that the liquid crystal filling opening 62 was dipped into the liquid crystal composition No. 1. Thereafter, nitrogen or air was introduced into the container by closing the adjustment valve and opening an adjustment valve of a leak pipe, so that the liquid crystal composition No. 1 was filled into the panel portion 60 of the liquid crystal device. After the filling was completed, the liquid crystal filling opening 62 was sealed by an ultraviolet curing agent (acrylic resin).

Here, the liquid crystal L was converted to isotropic liquid by maintaining the liquid crystal device at a temperature of 80° C. for a predetermined period. By doing so, the polymerizable monomer and the polymeric initiator in the liquid crystal composition were uniformly dispersed.

Thereafter, a polymer stabilization process was performed where the polymerizable monomer in the liquid crystal composition No. 1 was polymerized by irradiating ultraviolet from the first substrate 10 which is a TFT array substrate. In this way, a liquid crystal device having the liquid crystal layer 30 which was formed using the liquid crystal composition No. 1 was manufactured.

In addition, by a similar process, a liquid crystal device (hereinafter referred to as "comparative device") having a liquid crystal layer that does not contain polymer was manufactured using the host liquid crystal (that is, a fluorine nematic liquid crystal composition same as the liquid crystal L contained in the liquid crystal composition No. 1) as liquid crystal composition instead of the liquid crystal composition No. 1.

The response speeds of the liquid crystal device and the comparative device manufactured in this manner were evaluated. The evaluation results at a temperature of 20° C. showed an improvement in the response time ($\tau_{off}$) which was 38 ms for the liquid crystal device that used the liquid crystal composition No. 1, whereas the response time was 40 ms for the comparative device that used only the host liquid crystal.

In addition, the evaluation results at a temperature of 0° C. also showed an improvement in the response time which was 145 ms for the liquid crystal device that used the liquid crystal composition No. 1, whereas the response time was 150 ms for the comparative device. Although the liquid crystal device that used the liquid crystal composition No. 1 showed an improvement in the response time, an effect thereof was small.

Subsequently, the liquid crystal device that used the liquid crystal composition No. 1 was disassembled, and the liquid crystal L in the liquid crystal panel was washed by benzene. After that, the liquid crystal panel having benzene filled therein was cooled to a temperature of 0° C. so as to remove the benzene by a freeze-dry method. Then, the liquid crystal panel after the benzene was removed was observed using an electron microscope.

As the result of observation, fibrils of polymer (lumps of polymer chains) were observed almost uniformly in the gap between the second substrate 20 which is the color filter substrate and the first substrate 10 which is the TFT substrate. Here, In the IPS-mode liquid crystal device, stabilization of the liquid crystal L is realized most effectively by the polymer which is present in the liquid crystal layer 30 close to the first substrate 10 which is the TFT substrate.

In this respect, it was considered that, when the weight percentage of the polymerizable monomer mixed in the liquid crystal L is as small as about 1.0 wt %, and the polymer is distributed over the entire area of the liquid crystal layer 30, since the polymer density on the side of the first substrate 10 which is the TFT substrate is small, a sufficient effect of improving the response time may not be obtained.

EXAMPLE 2

An IPS-mode liquid crystal device was manufactured by the same process as Example 1 described above. However, the liquid crystal layer 30 was formed using different liquid crystal composition (hereinafter referred to as liquid crystal composition No. 2) including an ultraviolet absorbing agent, polymerizable monomer, polymeric initiator, and liquid crystal L.

As the ultraviolet absorbing agent, phenyl salicylate ester derivative was used. As the polymerizable monomer, polymeric initiator and liquid crystal L, bifunctional acrylic monomer, 2,2-diethoxy-phenyl-acetophenone, and fluorine nematic liquid crystal composition were used, respectively, similarly to Example 1 described above.

The weight percentages of the ultraviolet absorbing agent, polymerizable monomer, polymeric initiator, and liquid crystal L in the liquid crystal composition No. 2 were 1.0 wt %, 1.0 wt %, 0.05 wt %, and 97.95 wt %, respectively.

Moreover, the response speed of the liquid crystal device manufactured using the liquid crystal composition No. 2 was evaluated in a manner similar to Example 1 described above. The evaluation results at a temperature of 20° C. showed an improvement in the response time ($\tau_{off}$) which was 34 ms for the liquid crystal device that used the liquid crystal composition No. 2, whereas as mentioned above, the response time was 40 ms for the comparative device that used the host liquid crystal.

In addition, the evaluation results at a temperature of 0° C. also showed an improvement in the response time which was 132 ms for the liquid crystal device that used the liquid crystal composition No. 2, whereas as described above, the response time was 150 ms for the comparative device.

That is, the effect of improving the response time of the liquid crystal device that used the liquid crystal composition No. 2 was superior to the effect obtained in Example 1 described above. Moreover, in the liquid crystal device that used the liquid crystal composition No. 2, there was no reduction in the voltage holding ratio and thus there was no practical problem.

Subsequently, the gap between the first substrate 10 and the second substrate 20 was observed using an electron microscope in a manner similar to Example 1 described above. As the result of observation, 70% or more of the fibrils were observed as being eccentrically distributed on the side of the first substrate 10 which is the TFT substrate. That is, 70% or more of the polymer contained in the liquid crystal layer 30 was contained in the first part 31 (see FIG. 1) of the liquid crystal layer 30, which is a half part close to the first substrate 10.

In this way, by forming the liquid crystal layer 30 using the liquid crystal composition No. 2 containing the ultraviolet absorbing agent, it was possible to selectively increase the fibril density on the side of the TFT substrate (first substrate 10) which is most effective. Thus, it was considered that the response time of the liquid crystal device was effectively improved as a consequence.

That is, by achieving polymer stabilization of the liquid crystal L using the liquid crystal composition No. 2 to which the ultraviolet absorbing agent was added, the polymer chains were formed to be eccentrically distributed on the TFT substrate (first substrate 10) side. Thus, the liquid crystal device, which had an excellent response speed over a wide temperature range and excellent reliability compared to the liquid crystal device that used the liquid crystal composition No. 1 described above and the comparative device, was manufactured.

In addition, it was found that during the polymer stabilization process, it is more desirable to perform multiple ultraviolet irradiations in an intermittent manner than performing single ultraviolet irradiation for a long continuous period.

That is, when the liquid crystal layer 30 was formed by performing the intermittent ultraviolet irradiations to the liquid crystal composition No. 2, the liquid crystal device that had the liquid crystal layer 30 showed a greater improvement in the response time which was 32 ms at a temperature of 20° C.

In this case, it was considered that, the polymeric initiator which remains in a side of the liquid crystal layer 30 close to the color filter substrate (second substrate 20) and at the central part thereof are dispersed to be redistributed toward the TFT substrate (first substrate 10) during the intervals of the plural ultraviolet irradiations (namely, the intervals when ultraviolet is not irradiated). Therefore, when the ultraviolet irradiation is started again, polymerization is preferentially performed on the TFT substrate (first substrate 10) side, and thus the polymer can be eccentrically distributed.

EXAMPLE 3

An IPS-mode liquid crystal device was manufactured by the same process as Example 1 described above. However, the liquid crystal layer 30 was formed using liquid crystal composition (hereinafter referred to as liquid crystal composition No. 3) including polymerizable monomer, polymeric initiator whose solubility parameter is 12.4 $(cal/cm^3)^{0.5}$, and liquid crystal L.

That is, as the polymeric initiator, 2-hydroxy-2-methylpropiophenone (DAROCURE 1173: NAGASE & CO., LTD) whose solubility parameter is 12.4 $(cal/cm^3)^{0.5}$ was used. As the polymerizable monomer and liquid crystal L, bifunctional acrylic monomer and fluorine nematic liquid crystal composition were used, respectively, similarly to Example 1 described above.

The weight percentages of the polymerizable monomer, polymeric initiator, and liquid crystal L in the liquid crystal composition No. 3 were 1.0 wt %, 0.05 wt %, and 98.95 wt %, respectively.

Moreover, the response speed of the liquid crystal device manufactured using the liquid crystal composition No. 3 was evaluated in a manner similar to Example 1 described above. The evaluation results at a temperature of 20° C. showed an improvement in the response time ($\tau_{off}$) which was 33 ms for the liquid crystal device that used the liquid crystal composition No. 3, whereas as mentioned above, the response time was 40 ms for the comparative device that used the host liquid crystals.

In addition, the evaluation results at a temperature of 0° C. also showed an improvement in the response time which was 131 ms for the liquid crystal device that used the liquid crystal composition No. 3, whereas as described above, the response time was 150 ms for the comparative device.

That is to say, the effect of improving the response time of the liquid crystal device that used the liquid crystal composition No. 3 was superior to the effect obtained in Example 1 described above. Moreover, in the liquid crystal device that used the liquid crystal composition No. 3, there was no reduction in the voltage holding ratio and thus there was no practical problem.

Subsequently, the gap between the first substrate 10 and the second substrate 20 was observed using an electron microscope in a manner similar to Example 1 described above. As the result of observation, 70% or more of the fibrils were observed as being eccentrically distributed on the side of the first substrate 10 which is the TFT substrate. That is, 70% or more of the polymer contained in the liquid crystal layer 30 was contained in the first part 31 (see FIG. 1) of the liquid crystal layer 30, which is a half part close to the first substrate 10.

In this way, by forming the liquid crystal layer 30 using the liquid crystal composition No. 3 containing the polymeric initiator, it was possible to selectively increase the fibril density on the side of the TFT substrate (first substrate 10) which is most effective. Thus, it was considered that the response time of the liquid crystal device was effectively improved as a consequence.

That is, by achieving polymer stabilization of the liquid crystals L using the liquid crystal composition No. 3 containing the polymeric initiator having a large solubility parameter, the polymer chains were formed to be eccentrically distributed on the TFT substrate (first substrate 10) side. Thus, the liquid crystal device, which had an excellent response speed over a wide temperature range and excellent reliability compared to the liquid crystal device that used the liquid crystal composition No. 1 described above and the comparative device, was manufactured.

EXAMPLE 4

An IPS-mode liquid crystal device was manufactured by the same process as Example 1 described above. That is, the liquid crystal layer 30 was formed using the liquid crystal composition No. 1 which were used in Example 1 described above.

The weight percentages of the polymerizable monomer, polymeric initiator, and liquid crystal L in the liquid crystal composition No. 1 were 1.0 wt %, 0.05 wt %, and 98.95 wt %, respectively.

However, the solubility parameter of the alignment layer 11 formed on the first substrate 10 which is the TFT substrate and the solubility parameter of the alignment layer 21 formed on the second substrate 20 which is the color filter substrate were different from each other and were 12.4 $(cal/cm^3)^{0.5}$ and 10.9 $(cal/cm^3)^{0.5}$, respectively. That is, the solubility parameter of the alignment layer 11 on the first substrate 10 side was larger than the solubility parameter of the alignment layer 21 on the second substrate 20 side and was 12.0 $(cal/cm^3)^{0.5}$ or more.

The polyimide that constitutes the alignment layer 11 on the first substrate 10 side was polyimide that had a main skeleton which was generated by polymerizing n-hexane tetra carbonate dianhydrides used as tetra carbonate dianhydrides and phenylenediamine used as diamine derivatives.

The polyimide that constitutes the alignment layer 21 on the second substrate 20 side was polyimide that had a main skeleton which was generated by polymerizing n-hexane tetra carbonate dianhydrides used as tetra carbonate dianhydrides and 1,6-diaminohexane used as diamine derivatives.

In addition, the solubility parameter of the 2,2-diethoxyphenyl-acetophenone used as the polymeric initiator was 10.7 $(cal/cm^3)^{0.5}$ as described above.

The response speed of the liquid crystal device that had the alignment layers 11 and 21 having different solubility parameters was evaluated in a manner similar to Example 1 described above. The evaluation results at a temperature of 20° C. showed an improvement in the response time ($\tau_{off}$) which was 31 ms for the liquid crystal device that had the alignment layers 11 and 21 having different solubility parameters, whereas as mentioned above, the response time was 40 ms for the comparative device that used the host liquid crystal.

In addition, the evaluation results at a temperature of 0° C. also showed an improvement in the response time which was 131 ms for the liquid crystal device that had the alignment layers 11 and 21 having different solubility parameters, whereas as described above, the response time was 150 ms for the comparative device.

That is, the effect of improving the response time of the liquid crystal device that had the alignment layers 11 and 21 having different solubility parameters was superior to the effect obtained in Example 1 described above. Moreover, in this liquid crystal device, there was no reduction in the voltage holding ratio and thus there was no practical problem.

Subsequently, the gap between the first substrate 10 and the second substrate 20 was observed using an electron microscope in a manner similar to Example 1 described above. As the result of observation, 70% or more of the fibrils were observed as being eccentrically distributed on the side of the first substrate 10 which is the TFT substrate. That is, 70% or more of the polymer contained in the liquid crystal layer 30 was contained in the first part 31 (see FIG. 1) of the liquid crystal layer 30, which is a half part close to the first substrate 10.

In this way, by providing the alignment layer 11 on the TFT substrate (first substrate 10) side, whose solubility parameter is larger than the solubility parameter of the alignment layer 21 on the second substrate 20 side and is 12.0 $(cal/cm^3)^{0.5}$ or more, it was possible to selectively increase the fibril density on the side of the TFT substrate (first substrate 10) which is most effective. Thus, it was considered that the response time of the liquid crystal device was effectively improved as a consequence.

That is, by achieving polymer stabilization of the liquid crystal L in the liquid crystal device that used the alignment layer 11 having large solubility parameter, the polymer chains were formed to be eccentrically distributed on the TFT substrate (first substrate 10) side. Thus, the liquid crystal device, which had an excellent response speed over a wide temperature range and excellent reliability compared to the liquid crystal device that used the liquid crystal composition No. 1 described above and the comparative device, was manufactured.

The present invention is not limited to the examples described above. That is, the improvement in the response speed was mainly described for a liquid crystal device in which the liquid crystal L is driven in the IPS mode. However, since it is supposed that the improvement results from an improvement in the elastic modulus of the polymer-stabilized liquid crystal compositions, liquid crystal devices of other modes, such as, for example, VA mode, TN mode, STN mode, OCB mode, and FFS mode will certainly exhibit an excellent response speed over a wide temperature range and also has excellent reliability.

Moreover, even when the liquid crystal layer 30 was formed by filling the liquid crystal composition using an ODF (one-drop filling) method rather than a vacuum filling method, it is certainly possible to provide a liquid crystal device which has an excellent response speed over a wide temperature range and also has excellent reliability.

According to the present invention, a liquid crystal device, that has an excellent response speed and excellent reliability over a wide temperature range in which compact liquid crystal devices such as, for example, cellular phones and car navigations can be used, is realized.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A liquid crystal device comprising:
   a first substrate and a second substrate, at least one of which has an electrode group formed thereon for driving a liquid crystal; and
   a liquid crystal layer sandwiched between the first substrate and the second substrate;
   wherein the liquid crystal layer contains a liquid crystal, a polymeric initiator, and a polymer which is eccentrically distributed on at least one substrate side among the first substrate and the second substrate;
   wherein a solubility parameter of the polymeric initiator is at least 12.0 $(cal/cm^3)^{0.5}$;
   wherein the solubility parameter of the polymeric initiator is larger than a solubility parameter of the liquid crystal; and
   wherein a solubility parameter of an alignment layer formed on at least one of the first substrate and the second substrate is at least 12.0 $(cal/cm^3)^{0.5}$.

2. The liquid crystal device according to claim 1, wherein the content of the polymer in the liquid crystal layer is 2.0 wt % or smaller.

3. The liquid crystal device according to claim 1, wherein the electrode group is formed on the first substrate and the second substrate is facing the first substrate.

4. The liquid crystal device according to claim 3, wherein the liquid crystal device is an IPS-mode liquid crystal device.

5. The liquid crystal device according to claim 3, wherein 70 wt % or more of the polymer is contained in a part of the liquid crystal layer close to one of the substrates.

6. The liquid crystal device according to claim 1, wherein the polymer is generated by irradiating ultraviolet to a liquid crystal composition that contains a photo-polymerizable monomer and an ultraviolet absorbing agent between the first substrate and the second substrate so as to polymerize the photo-polymerizable monomer.

7. The liquid crystal device according to claim 6, wherein the ultraviolet absorbing agent is an ultraviolet absorbing agent having liquid crystallinity.

8. The liquid crystal device according to claim 7, wherein the ultraviolet absorbing agent contains a terphenyl group or a quaterphenyl group in its molecules.

9. The liquid crystal device according to claim 1, wherein the polymer is generated by irradiating light to a liquid crystal composition that contains a photo-polymerizable monomer and the polymeric initiator having the solubility parameter of at least 12.0 $(cal/cm^3)^{0.5}$ disposed between the first substrate and the second substrate so as to polymerize the photo-polymerizable monomer.

10. The liquid crystal device according to claim 9, wherein the polymeric initiator is a polymeric initiator having liquid crystallinity.

11. The liquid crystal device according to claim 1, wherein the solubility parameter of the alignment layer formed on the one of the first substrate and the second substrate is larger than a solubility parameter of an alignment layer formed on the other substrate.

* * * * *